Sept. 14, 1965    G. K. HAUSE    3,205,730
VEHICLE POWER PACKAGE
Filed June 6, 1961    2 Sheets-Sheet 1
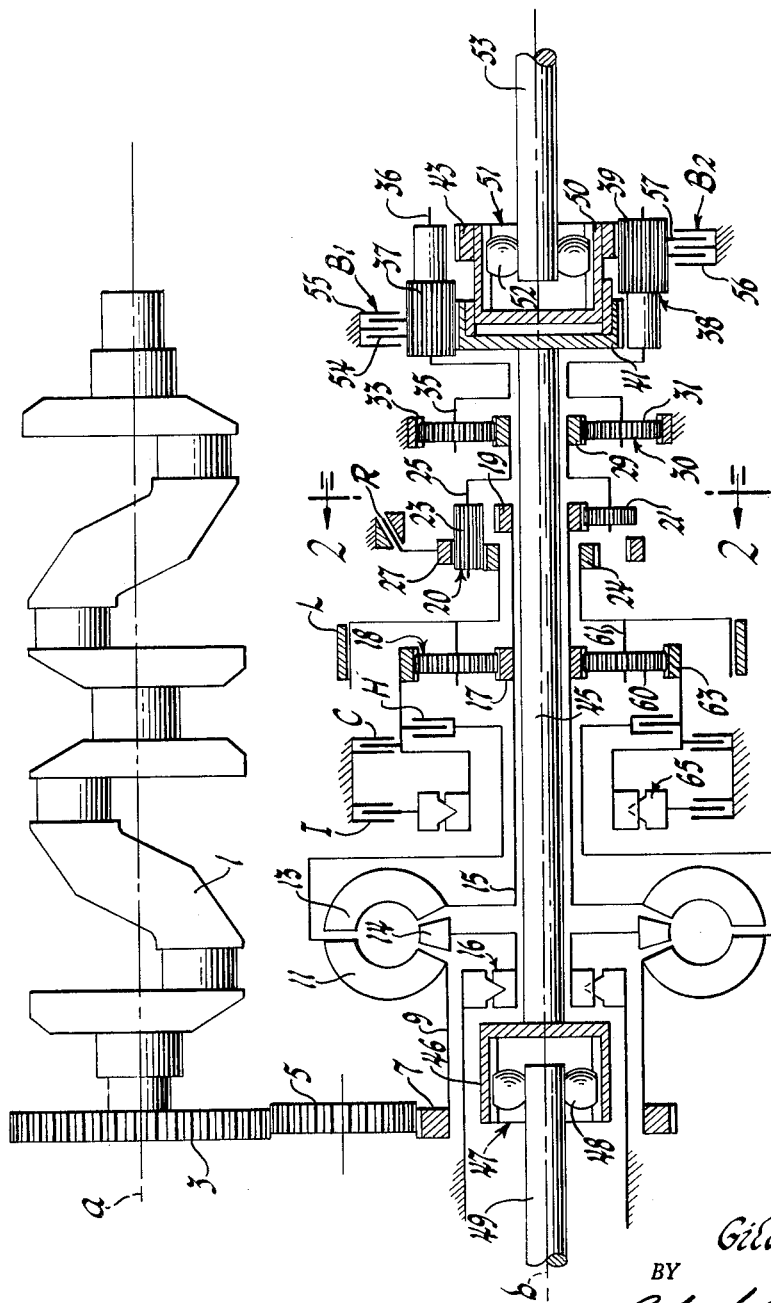
INVENTOR.
Gilbert K. Hause
BY
Robert B. Gerhardt
ATTORNEY

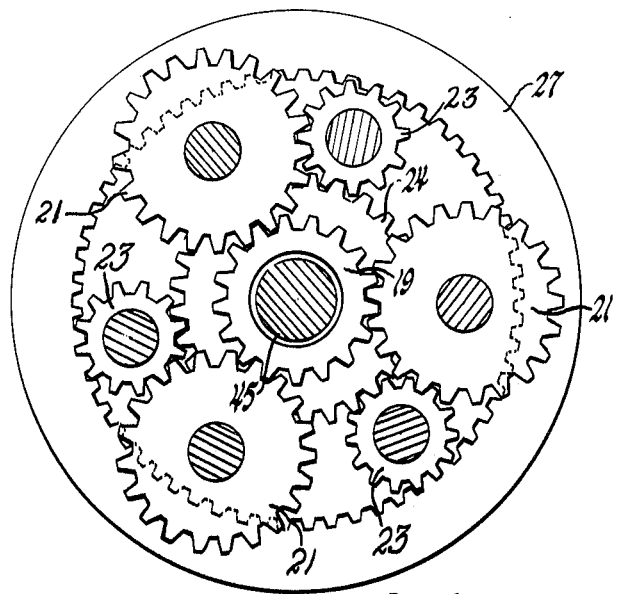
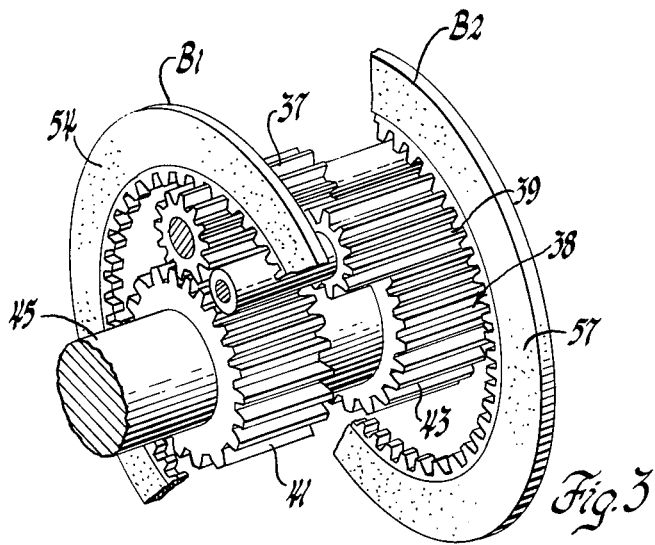
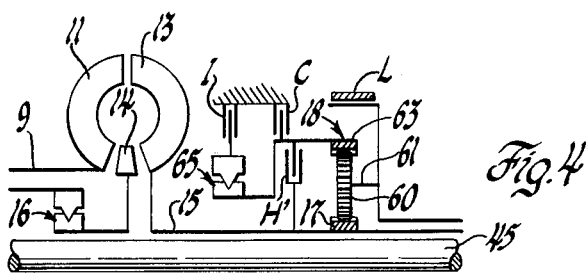

United States Patent Office 3,205,730
Patented Sept. 14, 1965

3,205,730
VEHICLE POWER PACKAGE
Gilbert K. Hause, Bloomfield Hills, Mich., assignor to General Motors Corporation, Detroit, Mich., a corporation of Delaware
Filed June 6, 1961, Ser. No. 115,205
8 Claims. (Cl. 74—688)

This invention relates to power transmission systems and more particularly to motor vehicle drives utilizing combined change speed transmission, final drive differential and vehicle brake units.

There is a growing tread in motor vehicle design to combine the change speed mechanism with the final axle drive. A further combination includes the engine, transmission, final gear reduction, differential and even the vehicle brakes as a single compact unit. An example of such a combination is shown in my application S.N. 855,840 entitled "Power Transmission System," filed November 27, 1959, now Patent No. 3,029,662. The combined unit, or power package as it is sometimes called, shown in the application has the engine and a portion of the change speed transmission including a hydraulic torque converter on one axis and the rest of the change speed transmission, the final gear reduction, differential brake, universal joints and drive axles on a second axis spaced from and parallel to the engine axis. In order to provide additional space for a larger engine it would be desirable to include the complete change speed transmission on the axle axis.

Currently there are a wide range of engines being used in motor vehicles. The size of these range from a few dozen to hundreds of horsepower. To accommodate all of the engines used in economy cars, small cars, large cars, etc., it has been necessary to provide a number of different transmissions to accommodate all of these engines. This is necessary because of the different speed, torque and horsepower performance characteristics of the different sized engines. The present invention contemplates a power unit wherein it is relatively easy to provide different fixed speed ratio drives between the engine and the hydraulic torque converter and also easy to vary the final gear reduction to supply the proper overall torque and speed drive to the wheels of the motor vehicle.

It is therefore an object of this invention to provide a compact power unit including an engine, change speed transmission, differential, brakes and drive axles.

It is still another object to provide a power unit including a hydraulic torque converter wherein a variety of engines can operate at a desirable speed and torque conditions and yet in which the torque converter will be operated at proper stall speeds and torque curve conditions.

A further object is to provide a relatively simple change speed transmission including a hydraulic torque converter and three speed gearing.

Still another object is to provide a differential mechanism combined with a change speed transmission and including integral braking mechanism for stopping the vehicle.

These and other objects and advantages will be apparent to those skilled in the art from the following specification and figures in which:

FIGURE 1 is a schematic representation of the invention showing a part of an engine—transmission—differential and brake unit;

FIGURE 2 is a sectional view taken on the line 2—2 of FIGURE 1;

FIGURE 3 is a schematic view showing details of the differential and brake assembly; and FIGURE 4 is a schematic representation of a modified transmission with only a portion of the complete unit shown.

Referring to FIGURE 1, illustrating one application of the invention, there is shown a combined transmission, differential and brake unit incorporated in a single power package that includes an engine having a crankshaft 1. The engine, which forms no part of the invention, may be of any suitable form and may be located at any suitable vehicle location. A suitable engine is shown in my copending application S.N. 37,759, filed June 21, 1960, now abandoned.

The crankshaft 1 rotates on an axis $a$ and rotates a gear 3 which drives an idler gear 5 which in turn drives a gear 7. The gear 7 is connected in any suitable manner to an input shaft 9 of the combined transmission differential unit. By proper selection of the gears 3, 5 and 7, various fixed engine output to transmission input ratios can be secured. The gearing shown provides a one to one ratio, however, if a small high speed engine is used the gearing 3, 5, 7 could provide a speed reduction whereas if a large relatively slow speed engine is used, these gears can provide an overdrive ratio. In any event the engine can be operated at a speed wherein its torque is at or near a maximum when the stall speed of the torque converter is reached. Other drive connections than the gears 3-5-7 could be utilized to transmit the power or change the speed of the drive from the engine to the transmission, for example, a chain drive, belt drive, etc.

The combined transmission, differential and brake unit is rotatable about an axis $b$ spaced from and parallel to the engine axis $a$. The transmission input shaft 9 is connected to a vaned impeller member represented by the vane 11. The impeller 11 is shown as part of a conventional three element hydraulic torque converter which also includes vaned turbine member represented by the vane 13 connected to a converter output shaft 15, and a vaned stator member represented by vane 14. Backward rotation of the stator 14 is prevented by a one-way device represented by the ratchet device 16. Other forms of hydrodynamic torque transmitting devices may be used in place of the three element converter shown.

The torque converter output shaft 15 connected to the turbine 13 is connected to drive a pair of sun gears 17 and 19, the sun gear 17 being formed as part of a simple planetary gear unit, generally designated 18, and the sun gear 19 being formed as part of a compound planetary gear unit, generally designated 20. The gear unit 20 includes a pair of intermeshing planet pinions 21 and 23 rotatable on the carrier member 25. The pinions 21 are relatively short and mesh with a small diameter sun gear 19, while the pinions 23 are longer and mesh with a second larger diameter sun gear 24. As will be explained later the sun gear 19 is an input gear, while the sun gear 24 functions either as a forward reaction gear or an input gear. A ring gear 27 that functions as a reverse reaction gear, meshes with the long pinions 23. The brake band L anchored to a stationary part of the mechanism, can be applied to hold the sun gear 24 from rotation and a cone brake R can be applied to hold the ring gear 27 from rotation.

The output carrier 25 of the gear unit 20 is connected to an input sun gear 29 of another simple planetary gear unit, generally designated 30, and which includes a plurality of planet pinions 31 rotatable on a carrier 35 and meshing with a stationary ring gear 33 fixed to the transmission-differential housing. The carrier member 35 is connected to still another planet carrier 36 formed as part of a differential unit, generally designated 38.

As seen in FIGURES 1 and 3 the differential unit 38 includes one or more pairs of intermeshing pinions 37 and 39 rotatable on the carrier member 36. Only one pair of pinions 37 and 39 are shown. A sun gear 41 meshes with the pinion 37 while a second sun gear 43 meshes with the pinion 39. The sun gear 41 is connected in any suitable manner to drive a shaft 45 that extends through the transmission shaft 15 and which carries the outer drive member 46 of an axially sliding or pot type universal joint, generally designated 47. This universal joint 47 also has an axial sliding pivot pin 48 connected to and driving an output shaft or axle 49. The sun gear 43 is splined on or otherwise drivingly connected to the outer element 50 of a second axially sliding or pot type universal joint, generally designated 51, that has a sliding pivot pin 52 connected to and driving a second output shaft or axle 53. The axle shafts 49 and 53 thus form a swing axle vehicle wheel drive.

Surrounding the planet pinions 37 of the differential unit 38 are a plurality of brake discs 54 having internal teeth that mesh with the teeth of planet pinions 37. The brake discs 54 form the rotatable portion of a multiple disc brake assembly, generally designated $B_1$, and which includes stationary disc members 55. A second multiple disc brake assembly, generally designated $B_2$, includes stationary disc 56 alternatively stacked with a plurality of discs 57 having internal teeth meshing with the planet pinions 39. Suitable actuating means, not shown, operate to engage the rotatable discs with the stationary discs of each brake unit.

Referring again to the first planetary gear unit 18, it will be seen that this gear unit includes a plurality of planet pinions 60 rotatable on a carrier 61 that is drivingly connected to the sun gear 24 of the compound gear set 20. Surrounding and meshing with the planet pinions 60 is a ring gear 63 whose rotation in either direction can be prevented by a multiple disc brake C. The reverse rotation of gear 63 can also be prevented by a multiple disc brake I connected to the ring gear 63 by means of a free-wheel or one-way device represented by the ratchet member 65. Thus when the brake C is engaged, the ring gear 63 is prevented from rotation in either direction, while energization of the brake I will prevent reverse rotation of the ring gear 63. A multiple disc clutch assembly H acts to connect the ring gear 63 with the impeller 11 and hence transmission input shaft 9. Suitable actuating means for brakes C and I, as well as clutch H, would be provided but are not shown since the details of the same form no part of the invention.

*Operation*

To obtain a neutral condition, the brakes I, C, L, R and the clutch H are all disengaged. Under this condition, there is no gear reaction in either the planet unit 18 or compound planet unit 20 and hence any rotation of the sun gear 17 and 19 by the shaft 15 being driven by the turbine 13 will not cause any drive to be transmitted to the carrier 25.

To start the vehicle, the low band L is applied to hold the sun gear 24 from rotation and provide gear reaction for the unit 20. Operation of the engine crankshaft 1 to turn the gears 3, 5, 7, shaft 9, to rotate the impeller 11 will cause the impeller to circulate working fluid, in a known manner, to act on the turbine vanes 13, to rotate the turbine in a forward direction. Rotation of the turbine 13 causes forward rotation of the sun gears 17 and 19 and with the sun gear 24 held against rotation by the brake band L, the carrier 25 is caused to rotate forwardly at a reduced speed.

The torque converter operates as a conventional three element converter to initially provide torque multiplication due to the stator 14 redirecting the rotating oil or fluid from the turbine into a forward direction when re-entering the impeller vanes 11. The torque multiplication of the converter is gradually reduced as the turbine 13 increases its rotational speed until oil leaving the turbine vanes 13 cause the stator 14 to free-wheel forwardly at which time the converter performs as a fluid coupling with minimum slip.

Rotation of the carrier 25 is at increased torque and a reduced speed due to the combined effect of any ratio of the gears 3, 5, and 7, the torque multiplication in the hydraulic torque converter and the torque multiplication of the gear set 20 as determined by the gear tooth ratios of that gear unit. The carrier 25 drives the sun gear 29 forward and since the ring gear 33 is stationary, the output carrier 35 rotates at still a further reduced speed and increased torque ratio. This causes the differential carrier 36 to rotate forwardly and through the mutual reaction of the meshing pinions 37 and 39 drive the sun gears 41 and 43. The drive from the sun gears 41 and 43 is then through the universal joints 47 and 51, to the axle 49 and 53 to the driving wheels, not shown. The sun gears 41 and 43 and connected elements are caused to rotate forward at the speed of the carrier 36. If the load on either driving axle is greater than on the other driven axle, the differential arrangement will permit the axles to rotate at different speeds. The sun gears 41 and 43 then rotating relative to each other causing the pinions 37 and 39 to rotate relative to each other.

During this low drive operation, the sun gear 17 is driven forward and the carrier 61 of the planet unit 18 held against rotation. This causes the ring gear 63 to rotate reversely, such rotation being permitted because the brakes I and C are disengaged and the clutch H is also disengaged. Upon obtaining sufficient vehicle speed in low gear, the band L is disengaged and the brake I engaged. Rotation of the sun gear 17 then effects a reduced speed forward drive of the carrier 61 and sun gear 24, the ring gear 63 acting to provide the gear reaction in the gear set 18. This reaction is taken through the brake I and one-way device 65 which act to prevent rearward rotation of the ring gear 63. With the sun gear 19 rotating at the speed of the turbine 13 and the sun gear 24 rotating forwardly but at a slower speed than that of the turbine due to the gear reduction caused by the gear set 18, the carrier 25 is caused to rotate forward at a reduced speed which is faster than that obtained in low gear 24 is held against rotation. The drive from carrier 25 then is through the final reduction gear unit 30 and the differential unit 38 in the same manner as in low gear described above.

Highest gears is effected by applying the clutch H which connects the ring gear 63 to the impeller 11 to cause the same to rotate at the same speed as the transmission input shaft 9. At this time the sun gear 17 is rotating at the same speed as the turbine member 13, whose speed is only slightly less than that of the impeller 11 when the torque converted is operating as a fluid coupling. The free-wheel device 65 allows this forward rotation of the ring gear 63. The power from the engine shaft 1 transmitted through the input shaft 9 is then split into two paths with part being transmitted mechanically through the clutch H to the ring gear 63 and a portion being transmitted hydraulically through the torque converter to the turbine 13, shaft 15 and sun gear 17. Under these conditions the carrier 61 of the gear set 18 is caused to rotate forwardly at slightly less than the speed of the input shaft 9 and drives the sun gear 24 at this speed. Since the sun gear 19 is rotating at the turbine speed which is also only slightly less than the speed of the shaft 9, the carrier 25 is driven at a speed slightly less than that of the input shaft 9. This speed is reduced and the torque multiplied by the final gear reduction unit 30 whose output at the carrier 35 is transmitted through the differential unit 38 and the universal joints 47 and 51 to the drive axles 49 and 53.

To slow the vehicle or hold it stopped, the brakes $B_1$ and $B_2$ are simultaneously applied by any suitable mechanism and control. This action acts to retard or stop rotation of the discs 54 and 57. The rotation of planet pinions 37 and 43 about the main axis $b$ is retarded since these pinions can turn or rotate on the carrier only if they are turning at different speeds or in opposite directions. This combined retardation of the rotation of pinions 37 and 43 around the main differential axis $b$ as well as on their own axes, reatrds the rotation of the sun gears 41 and 43. This slows the wheels and the vehicle. With the discs 54 and 57 held stationary as when the vehicle is completely stopped, the sun gears 41 and 43 are held against any rotation.

In order to provide additional engine braking, as when descending a hill, the disc brake C can be applied to prevent rotation of the ring gear 63 in either direction. This conditions the transmission for intermediate drive and if the vehicle is coasting the wheels will act to drive the axles 49–53 and the differential 38. The differential carrier 36 will drive the carrier 35 of the final reduction unit 30 to cause an overdrive of the sun gear 29. This overdrive is further increased in speed by the gear sets 18 and 20 to overdrive the turbine 13 at a high rate of speed. The impeller 11 connected to the engine acts to slow the rotation of the turbine 13 and through the gearing and differential slow the wheels and vehicle.

The modification shown in FIGURE 4 is essentially the same as that of FIGURES 1 to 3 with the exception that the high gear clutch H' acts to connect the ring gear 63 and sun gears 17. This acts to lock up the planetary unit 18 and to directly transmit drive from the turbine 13 to the sun gear 24 of the compound gear unit 20. Thus in high drive both sun gear 24 and sun gear 19 of the planetary unit 20 (FIGURE 1) are driven at the turbine speed and the carrier 35 is driven at turbine speed. In this case all of the torque is transmitted through the torque converter.

In the case of FIGURE 1 when the high clutch H connects the ring gear 63 to the transmission input shaft 9 the torque is split into a mechanical and a hydraulic path and recombined at gear unit 18.

It should be pointed out that the engine may be a straight four cylinder, a V–8 or any other form. By varying the ratio of the gears 3, 5, and 7, as well as the ratio of the final reduction gear unit 30, the transmission differential can be used with a variety of engines and in a variety of vehicles. The combined unit may be used in a front wheel drive or a rear wheel drive vehicle. The complete unit can be easily removed and reinstalled from the vehicle for servicing.

It will be seen that I have provided a compact power unit that performs the normal functions of torque multiplying transmission, differential, torque multiplying axle and wheel brakes. The unit is adapted for use with a variety of engines and in a variety of vehicles without extensive modification. The invention is also easily adapted to various types of manual or automatic transmission and brake controls.

Other embodiments as well as changes and applications will be readily apparent to those skilled in the art and these can be made without departing from the spirit of the invention which is limited only by the following claims.

What is claimed is:

1. A motor vehicle transmission having an input shaft and an output shaft, a housing, first planetary gear means having a pair of input gear members and an output member connected to said output shaft, a hydraulic torque transmitting device having an input element connected to said input shaft, an output element connected to one of said input members and a stator always connected to said housing in at least one direction by means preventing rotation in at least one direction, said first planetary gear means having releasable means for holding the other of said input members to provide gear reaction for establishing forward speed low drive between said input shaft and said output shaft, second planetary gear means comprising an output member connected to the other of said first gear means input members, an input gear member connected to the output element of said hydraulic torque transmitting device for drive thereby, a reaction gear member and releasable means for selectively holding said reaction gear member for providing reduced speed forward drive by said second gear means between said input shaft and said other input member of said first gear means to establish forward speed intermediate drive between said input shaft and said output shaft, and means for connecting said transmission input shaft to said second gear means reaction member for drive therebetween to establish forward speed high drive between said input shaft and said output shaft.

2. A motor vehicle transmission having an input shaft and an output shaft, a housing, first planetary gear means having a pair of input gear members and an output member connected to said output shaft, a hydraulic torque transmitting device having an input element connected to said input shaft, an output element connected to one of said input members and a stator always connected to said housing in at least one direction by means preventing rotation in at least one direction, said first planetary gear means having releasable means for holding the other of said input members to provide gear reaction for establishing forward speed low drive between said input shaft and said output shaft, second planetary gear means comprising an output member connected to the other of said first gear means input members, an input gear member connected to the output element of said hydraulic torque transmitting device for drive thereby, a reaction gear member and releasable means for selectively holding said reacting gear member for providing reduced speed forward drive by said second gear means between said input shaft and said other input member of said first gear means to establish forward speed intermediate drive between said input shaft and said output shaft, means for connecting said transmission input shaft to said second gear means reaction member for drive therebetween to establish forward speed high drive between said input shaft and said output shaft, said first planetary gear means including a reverse reaction gear member for establishing reverse speed drive between said input shaft and said output shaft, and releasable means for holding said reverse reaction gear member.

3. A motor vehicle transmission having an input shaft and an output shaft, a first planetary gear set having first and second sun gear members, an output carrier member having a pair of intermeshing planet gears each meshing with one of said sun gears, said carrier member connected to said output shaft, a hydraulic torque transmitting device operatively connecting said input shaft with one of said sun gear members, releasable means for holding the other of said sun gear members to provide gear reaction for establishing forward speed low drive between said input shaft and said output shaft, a second planetary gear set comprising an output gear member connected to said other sun gear member, an input gear member connected to the output of said hydraulic torque transmitting device, a reaction gear member and releasable means for selectively holding said reaction gear member for providing reduced speed forward drive by said second gear set between said input shaft and said other sun gear member of said first gear set to establish forward speed intermediate drive between said input shaft and said output shaft, and means for connecting said transmission input shaft to said second gear set reaction member for drive therebetween to establish forward speed high drive between said input shaft and said output shaft.

4. A motor vehicle transmission having an input shaft and an output shaft, a first planetary gear set having first and second sun gear members, an output carrier member having a pair of intermeshing planet gears each meshing with one of said sun gears and a ring gear meshing with one of the planet gears, said carrier member connected to said output shaft, a hydraulic torque transmitting device operatively connecting said input shaft with one of said sun gear members, releasable means for holding the other of said sun gear members to provide gear reaction for establishing forward speed low drive between said input shaft and said output shaft, a second planetary gear set comprising an output gear member connected to said other sun gear member, an input member connected to the output of said hydraulic torque transmitting device, a reaction gear member and releasable means for selectively holding said reaction gear member for providing reduced speed forward drive by said second gear set between said input shaft and said other sun gear member of said first gear set to establish forward speed intermediate drive between said input shaft and said output shaft, means for connecting said transmission input shaft to said second gear set reaction member for drive therebetween to establish forward speed high drive between said input shaft and said output shaft, and releasable means for holding said ring gear to provide gear reaction in said first gear set for establishing reverse drive between said input shaft and said output shaft.

5. A motor vehicle transmission having an input shaft and an output shaft, a first planetary gear set having first and second sun gear members and an output carrier member having a pair of intermeshing planet gears each meshing with one of said sun gears, said carrier member connected to said output shaft, a hydraulic torque transmitting device operatively connecting said input shaft with one of said sun gear members, releasable means for holding the other of said sun gear members to provide gear reaction for establishing forward speed low drive between said input shaft and said output shaft, a second planetary gear set comprising an output carrier member connected to said other sun gear member, a sun gear member connected to the output of said hydraulic torque transmitting device and a reaction ring gear member and releasable means for selectively holding said reaction gear member for providing reduced speed drive between said input shaft and said other sun gear member of said first gear set to establish forward speed intermediate drive between said input shaft and said output shaft, and means for connecting said transmission input shaft to said second gear set ring gear member for drive therebetween to establish forward speed high drive between said input shaft and said output shaft.

6. In a transmission; a housing; a drive member driving in a forward direction; a driven member driven in said forward direction; a hydraulic torque converter having a pump connected to said driving member, a turbine, and a stator continuously mounted on said housing by a one-way brake preventing reverse rotation and permitting free wheeling rotation in a forward direction; first planetary gear means having a pair of input members and an output member connected to drive said driven member with one input member connected to said turbine for drive by said turbine and brake means connected to said other input member for holding the other input member to provide gear reaction for torque converter forward speed low drive to said driven member and second planetary gear means having first and second input members and an output member connected to drive said other input member of said first gear means having said first input member continuously connected to said turbine and means operative selectively, in a first position to free the second input member during said torque converter low ratio drive, in a second position to hold second input member for gear reaction for a forward reduction drive from said turbine to said other input member to provide torque converter intermediate drive and in a third position to connect said drive member to said second input member to provide forward split torque, torque converter and mechanical drive from said turbine and drive member to said second member to provide a high split torque forward drive.

7. The invention defined in claim 6 and said second gear means having a sun gear, a ring gear, and a carrier with pinions meshing with said sun and ring gears, said carrier being the output member, said sun gear being the first input member and said ring gear being the second input member.

8. The invention defined in claim 6 and said second gear means providing forward rotation of said output member in response to forward rotation of either input member.

References Cited by the Examiner

UNITED STATES PATENTS

| | | | |
|---|---|---|---|
| 1,383,988 | 7/21 | De Normanville | 74—759 |
| 2,324,713 | 7/43 | McFarland | 74—688 |
| 2,326,751 | 8/43 | Buckendale | 74—695 |
| 2,466,683 | 4/46 | Buckendale | 74—695 |
| 2,533,610 | 12/50 | Norelius | 74—695 X |
| 2,592,537 | 4/52 | Burtnett | 74—765 |
| 2,749,773 | 6/56 | Simpson | 74—688 |
| 2,834,228 | 5/58 | Place | 74—688 |
| 2,856,794 | 10/58 | Simpson | 74—763 |
| 2,981,125 | 4/61 | Dodge | 74—763 X |
| 2,982,152 | 5/61 | De Lorean | 74—688 |
| 3,003,367 | 10/61 | Winchell | 74—688 |
| 3,023,637 | 3/62 | De Lorean | 74—688 |
| 3,025,721 | 3/62 | De Lorean | 74—688 |
| 3,029,662 | 4/62 | Hause | 74—695 |
| 3,095,764 | 7/63 | Peras | 74—763 |

DON A. WAITE, *Primary Examiner.*

UNITED STATES PATENT OFFICE
CERTIFICATE OF CORRECTION

Patent No. 3,205,730

September 14, 1965

Gilbert K. Hause

It is hereby certified that error appears in the above numbered patent requiring correction and that the said Letters Patent should read as corrected below.

Column 1, line 13, for "tread" read -- trend --; column 4, line 38, after "gear" insert -- when the sun gear --; line 48, for "converted" read -- converter --.

Signed and sealed this 19th day of July 1966.

(SEAL)
Attest:

ERNEST W. SWIDER
Attesting Officer

EDWARD J. BRENNER
Commissioner of Patents